(12) United States Patent
Wang et al.

(10) Patent No.: US 11,219,862 B2
(45) Date of Patent: *Jan. 11, 2022

(54) METHOD FOR SEPARATION AND ENRICHMENT OF LITHIUM

(71) Applicant: QINGHAI INSTITUTE OF SALT LAKES, CHINESE ACADEMY OF SCIENCES, Xining (CN)

(72) Inventors: Min Wang, Xining (CN); Youjing Zhao, Xining (CN); Yan Li, Xining (CN); Huaiyou Wang, Xining (CN); Hongjun Yang, Xining (CN)

(73) Assignee: QINGHAI INSTITUTE OF SALT LAKES, CHINESE ACADEMY OF SCIENCES, Xining (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/954,532

(22) PCT Filed: Mar. 19, 2019

(86) PCT No.: PCT/CN2019/078651
§ 371 (c)(1),
(2) Date: Jun. 17, 2020

(87) PCT Pub. No.: WO2020/073612
PCT Pub. Date: Apr. 16, 2020

(65) Prior Publication Data
US 2020/0330925 A1   Oct. 22, 2020

(30) Foreign Application Priority Data

Oct. 10, 2018  (CN) .......................... 201811178725.4

(51) Int. Cl.
*B01D 61/02* (2006.01)
*B01D 61/06* (2006.01)
(Continued)

(52) U.S. Cl.
CPC .......... *B01D 61/58* (2013.01); *B01D 61/022* (2013.01); *B01D 61/025* (2013.01);
(Continued)

(58) Field of Classification Search
CPC .... B01D 61/025; B01D 61/027; B01D 61/05; B01D 61/58; B01D 2311/04; C22B 26/12
See application file for complete search history.

(56) References Cited

U.S. PATENT DOCUMENTS

2012/0067808 A1* 3/2012 Tayalia ................. B64D 17/70
210/321.66
2012/0205313 A1* 8/2012 Sathrugnan ............... C02F 9/00
210/652
(Continued)

FOREIGN PATENT DOCUMENTS

CN          1542147 A     11/2004
CN       101979339 A      2/2011
(Continued)

OTHER PUBLICATIONS

Choi, Jae-Hwan, Sung-Hye Kim, and Seung-Hyeon Moon. "Heterogeneity of ion-exchange membranes: the effects of membrane heterogeneity on transport properties." Journal of colloid and interface science 241.1 (2001): 120-126. (Year: 2001).*

(Continued)

*Primary Examiner* — Bradley R Spies
(74) *Attorney, Agent, or Firm* — Bayramoglu Law Offices LLC

(57) ABSTRACT

A method for separation and enrichment of lithium includes the following steps: pretreatment: diluting and filtering salina aged brine to obtain pretreated brine; separation: separating the pretreated brine via a nanofiltration separation system to obtain nanofiltration permeate and nanofiltration concentrate; first concentration: carrying out first concen- (Continued)

tration on the nanofiltration permeate via a reverse osmosis system to obtain reverse osmosis concentrate and reverse osmosis permeate; second concentration: carrying out second concentration on the reverse osmosis concentrate via an electrodialysis system to obtain electrodialysis concentrate and electrodialysis permeate, and the electrodialysis concentrate is solution enriching lithium ions. The present application couples several different membrane separation technologies by utilizing the advantages of different membrane separation technologies, thereby achieving the purposes of improving the separation efficiency of magnesium and lithium and improving the enrichment efficiency of lithium.

7 Claims, 1 Drawing Sheet

(51) Int. Cl.
    *B01D 61/42*     (2006.01)
    *B01D 61/58*     (2006.01)
    *C22B 26/12*     (2006.01)
    *B01D 61/04*     (2006.01)
    *B01D 61/14*     (2006.01)

(52) U.S. Cl.
    CPC ........... *B01D 61/027* (2013.01); *B01D 61/04* (2013.01); *B01D 61/06* (2013.01); *B01D 61/145* (2013.01); *B01D 61/422* (2013.01); *C22B 26/12* (2013.01); *B01D 2311/04* (2013.01); *B01D 2311/06* (2013.01); *B01D 2311/08* (2013.01); *B01D 2311/25* (2013.01); *B01D 2311/2649* (2013.01); *B01D 2317/022* (2013.01); *B01D 2317/025* (2013.01)

(56) References Cited

U.S. PATENT DOCUMENTS

2014/0311980 A1* 10/2014 Weston .................. C02F 1/442
                                                                  210/652
2018/0332865 A1* 11/2018 Ding ...................... A22C 29/02

FOREIGN PATENT DOCUMENTS

| | | | |
|---|---|---|---|
| CN | 103074502 A | * | 5/2013 |
| CN | 106865582 A | | 6/2017 |
| CN | 107720786 A | | 2/2018 |
| CN | 108264066 A | | 7/2018 |
| CN | 108314064 A | | 7/2018 |
| CN | 108996527 A | | 12/2018 |

OTHER PUBLICATIONS

Mehner, Angela C. "Multimedia and Ultrafiltration for Reverse Osmosis Pretreatment Aboard Naval Vessels." Inquiry: The University of Arkansas Undergraduate Research Journal 11.1 (2010): 14. (Year: 2010).*
Wang Yan et al—CN 103074502 A Machine Translation—May 1, 2013 (Year: 2013).*
Chen Licheng et al—CN 108314064 A Machine Translation—Jul. 24, 2018 (Year: 2018).*
Zhong Yuan et al—CN 106865582 A Machine Translation—Jul. 20, 2017 (Year: 2017).*

* cited by examiner

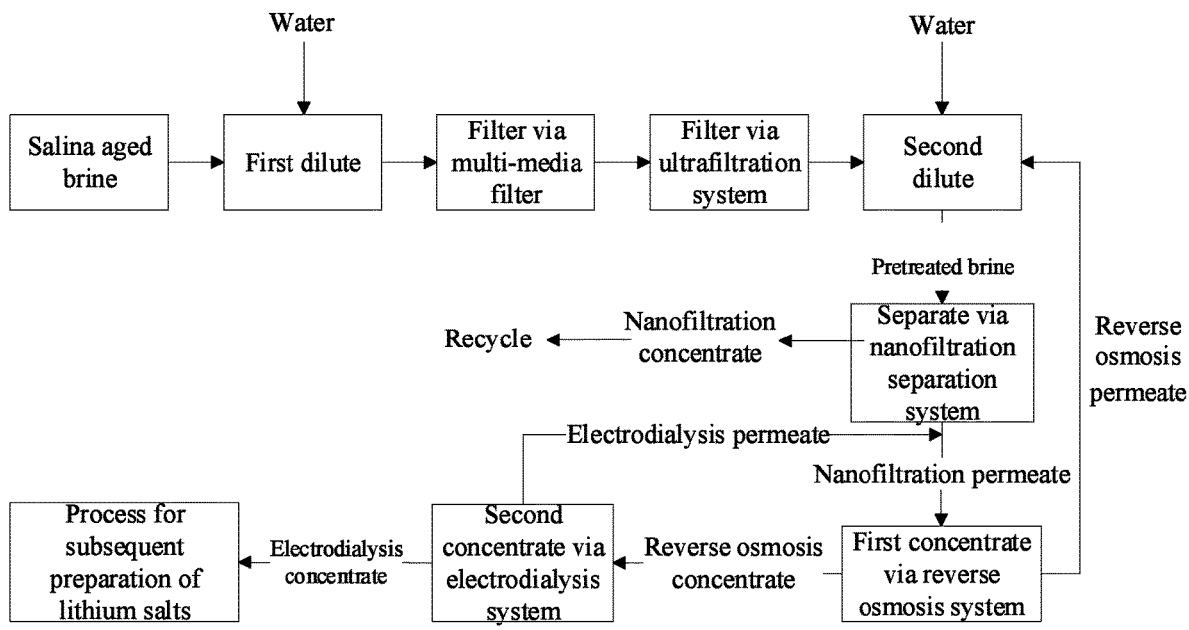

METHOD FOR SEPARATION AND ENRICHMENT OF LITHIUM

CROSS REFERENCE TO THE RELATED APPLICATIONS

This application is the national phase entry of International Application No. PCT/CN2019/078651, filed on Mar. 19, 2019, which is based upon and claims priority to Chinese Patent Application No. 201811178725.4, filed on Oct. 10, 2018, the entire contents of which are incorporated herein by reference.

TECHNICAL FIELD

The present application belongs to the technical field of separation and purification of solution, and particularly to a method for separation and enrichment of lithium.

BACKGROUND

Lithium is an extremely important strategic resource. As the lightest metal element, lithium exists in forms of solid mineral and liquid mineral in nature. There are rich lithium resource reserves in China, industrial lithium resource reserves that have been explored rank second in the world, where brine lithium accounts for 79%, and future reserves of salt lake brine lithium in only Qinghai Tibet Plateau area is equivalent to total reserves that have been explored in other countries in the world. It is estimated that the reserves of lithium resources in Qinghai Salt Lake (calculated by lithium) are 1.5 million tons, ranking first in the country. Therefore, the technology for extracting lithium from salt lake brine has become the top priority in China's competition for energy strategic highland, and is a major strategic demand of the country. However, it is very difficult to extract lithium from salt lake brine according to composition features of salt lake brine. This is mainly because one significant feature of salt lake brine is high magnesium and low lithium (that is, the content of magnesium ions is much higher than that of lithium ions). The mass ratio of magnesium to lithium in the most salt lake brines is higher than 40. For example, the mass ratio of magnesium to lithium in Chaerhan salt lake is as high as 1800 and as high as 114 in Dachaidan Salt Lake, and the mass ratio of magnesium to lithium in Qinghai salt lake brine is also very high. Due to similar chemical properties of magnesium and lithium, the presence of a large amount of magnesium can lead to increase in difficulty of separation and extraction of lithium. Therefore, it is necessary to develop new methods for separation and extraction of magnesium, lithium and other important resources in salt lake brine.

The existing magnesium and lithium separation methods mainly include a precipitation method, an adsorption method, an extraction method and the like. In the process of separation, all the above methods have a certain limitation. For example, the precipitation method is suitable for brine in which the mass ratio of magnesium to lithium is low, and there are problems of excessively large consumption of a precipitating agent and high cost when the mass ratio of magnesium to lithium is high; the adsorption method has problems of low adsorption capacity of the adsorbent and high cost; the extraction method has high requirement on extraction agents, and problems, such as environment pollution and equipment corrosion, are easily generated in the process of extraction. In addition, although the above methods can reach enrichment of lithium to a certain extent in the process of reducing the magnesium/lithium ratio of brine, the content of lithium ions in the finally obtained lithium-rich brine has not reached the concentration of preparing high-purity lithium salts, and thus it is required for further enrichment and concentration.

Except the above separation methods, there are also some studies on the separation of magnesium and lithium in salt lake brine by utilizing membrane separation technologies. For example, Chinese invention patent application No. 03108088.X introduces a method for separating magnesium and enriching lithium from salt lake brine by utilizing a nanofiltration method. Although the ratio of magnesium to lithium in salt lake brine is reduced to a certain extent by using this method, and the enrichment of lithium in brine is realized, the content of lithium ions in the finally obtained lithium-rich brine has not reached the lithium concentration required for the preparation of high-purity lithium salts, so it is necessary to continue the enrichment and concentration of lithium and the lithium ion yield in the separation process is low. Therefore, it is necessary to optimize the existing separation technology of magnesium and lithium in order to solve the problems of lithium ion enrichment efficiency, process cost and the like.

SUMMARY

In order to overcome the shortages of the prior art, this applicant has conducted intensive research and completed the application after a lot of creative work and in-depth experimental exploration.

For completing the foregoing objective of the disclosure, the technical solution adopted by the present application includes:

The present application provides a method for separation and enrichment of lithium, the method comprising:

pretreatment: diluting and filtering salina aged brine to obtain the pretreated brine;

separation: separating the pretreated brine via a nanofiltration separation system to obtain nanofiltration permeate and nanofiltration concentrate;

first concentration: carrying out first concentration on the nanofiltration permeate via a reverse osmosis system to obtain reverse osmosis concentrate and reverse osmosis permeate;

second concentration: carrying out second concentration on the reverse osmosis concentrate via an electrodialysis system to obtain electrodialysis concentrate and electrodialysis permeate, and the electrodialysis concentrate is solution enriching lithium ions.

Further, the reverse osmosis system is formed by connecting multiple sections of reverse osmosis units in series, the nanofiltration permeate is subjected to first concentration via various sections of the reverse osmosis units in turn to obtain the reverse osmosis concentrate and the reverse osmosis permeate, and the reverse osmosis permeate is circulated back to the pretreatment step and used for diluting the salina aged brine.

Further, the reverse osmosis system is formed by connecting three sections of reverse osmosis units in series, the quantity ratio of reverse osmosis membranes of various sections of reverse osmosis units is (22~62): (15~45): (5~43); the operation pressure in the first concentration step is 2.0 MPa~10.0 MPa, the concentration of lithium ions in the obtained reverse osmosis concentrate is 2.0 g/L~10 g/L, and the mass ratio of magnesium to lithium in the reverse osmosis concentrate is (0.05~3.0):1.

Preferably, the quantity ratio of the reverse osmosis membranes of various sections of the reverse osmosis units is (38~46): (25~35): (20~28); the operation pressure in the first concentration step is 3.5 MPa~7.0 MPa, the concentration of lithium ions in the obtained reverse osmosis concentrate is 3.0 g/L~5.0 g/L, and the mass ratio of magnesium to lithium in the reverse osmosis concentrate is (0.07~0.2):1.

Further, the pretreatment step is as follows: after being subjected to first dilution, the salina aged brine is successively filtered in a multi-media filter and an ultrafiltration system and then subjected to second dilution, so as to obtain the pretreated brine.

Further, in the pretreatment step, the concentration of lithium ions in the salina aged brine is 0.2 g/L~5.0 g/L, and the mass ratio of magnesium to lithium is (6~180):1; the first dilution multiple of the salina aged brine is 0.5~4.5 times, and the second dilution multiple after filtration via the ultrafiltration system is 3.5~20 times.

Preferably, in the pretreatment step, the concentration of lithium ions in the salina aged brine is 2.5 g/L~4.0 g/L, the mass ratio of magnesium to lithium is (6~55):1; the first dilution multiple of the salina aged brine is 2.5 times, and the second dilution multiple after filtration via the ultrafiltration system is 7.5 times.

Further, in the separation step, the nanofiltration separation system adopts a monovalent ion selective nanofiltration membrane which comprises at least two stages of nanofiltration separation devices, and each stage of the nanofiltration separation device is formed by connecting multiple sections of nanofiltration separation units in series; the pretreated brine is subjected to separation of magnesium and lithium via multiple sections of the nanofiltration units of a first-stage separation device and then subjected to separation of magnesium and lithium via multiple sections of the nanofiltration units of the next-stage separation device; after multiple stages of nanofiltration separation, the nanofiltration permeate and the nanofiltration concentrate are obtained, wherein the nanofiltration concentrate is recycled by an energy recovery device.

Further, the nanofiltration separation system comprises two stages of nanofiltration separation devices, and each stage of the nanofiltration separation device is formed by connecting three sections of nanofiltration separation units in series; in any one stage of nanofiltration separation device, the quantity ratio of nanofiltration membranes of three sections of the nanofiltration separation units is (35~85): (43~70): (25~55); the operation pressure of the nanofiltration separation system is 1.0 MPa~5.0 MPa, the concentration of lithium ions in the nanofiltration permeate is 0.2 g/L~2.0 g/L, and the mass ratio of magnesium to lithium in the nanofiltration permeate is (0.02~0.5):1.

Preferably, in any one stage of nanofiltration separation device, the quantity ratio of the nanofiltration membranes of three sections of the nanofiltration separation units is (55~65): (52~68): (35~45); the operation pressure of the nanofiltration separation system is 3.6 MPa~4.5 MPa, the concentration of lithium ions in the nanofiltration permeate is 0.5 g/L~1.2 g/L, and the mass ratio of magnesium to lithium in the nanofiltration permeate is (0.05~0.2):1.

Further, in the electrodialysis step, the ion exchange membrane used in the electrodialysis system is one of a homogeneous membrane, a semi-homogeneous membrane and a non-homogeneous membrane; the electrodialysis permeate is circulated back to the first concentration step and used for concentrating lithium ions; the concentration of lithium ions in the electrodialysis concentrate is 8 g/L~21 g/L, and the mass ratio of magnesium to lithium in the electrodialysis concentrate is (0.05~1.0):1.

Preferably, in the electrodialysis step, the ion exchange membrane used in the electrodialysis system is the homogeneous membrane, and the cation exchange membrane is an CMX homogeneous membrane, and the anion exchange membrane is an AMX homogeneous membrane; the concentration of lithium ions in the electrodialysis concentrate is 14 g/L~21 g/L, and the mass ratio of magnesium to lithium in the electrodialysis concentrate is (0.07~0.2):1.

The present application has the following beneficial effects:

First of all, the present application couples several different membrane separation technologies by utilizing the advantages of different membrane separation technologies, so that the salina aged brine is successively treated by the ultrafiltration system, the nanofiltration system, the reverse osmosis system and the electrodialysis system, thereby realizing the separation of magnesium and lithium and enrichment of lithium. Specifically, all mechanical impurities are filtered out through the ultrafiltration system; sufficient separation of magnesium ions and lithium ions and improvement of the concentration of lithium ions are realized through the nanofiltration system. After nanofiltration, the mass ratio of magnesium to lithium in the nanofiltration permeate has been greatly reduced from (6~180):1 in the original salina aged brine to (0.02~0.5):1. It can be seen that the separation step of the present application effectively realizes the separation of magnesium and lithium; lithium ions are concentrated through the reverse osmosis system to reduce the energy consumption of the whole process and improve the rationality of the whole process and system; finally, the lithium-containing concentrate is further concentrated through the electrodialysis system so that the content of lithium ions is greatly increased from 0.2 g/L~5.0 g/L of the original salina aged brine to 8 g/L~21 g/L so as to really realize the enrichment of lithium ions, thereby not only improving the enrichment efficiency but also ensuring the concentration of lithium ions after enrichment can meet the requirements of preparing high-purity lithium salts. To sum up, through the systematic research of the inventor of this patent, the coupling sequence of the above membrane separation systems is proposed, which can ensure that the process characteristics of different systems are fully utilized to realize the separation of magnesium and lithium in salt lake brine and efficient concentration and enrichment of lithium, and achieves the concentration of lithium ions required for the preparation of high-purity lithium salts.

Secondly, in the first concentration step, the method of the present application adopts the reverse osmosis system formed by connecting multiple sections of reverse osmosis units in series. Through multiple sections of reverse osmosis operation, the concentration of lithium ions is effectively increased in the process of reverse osmosis. In particular, the present application also studies and defines the quantity ratio of various reverse osmosis membranes in multiple sections of reverse osmosis units to more sufficiently reduce the permeability of lithium ions in reverse osmosis permeate.

Thirdly, in the separation step of the present application, a multi-section and multi-stage nanofiltration separation manner is adopted, and meanwhile a nanofiltration membrane which is efficient and can work under the ultra-high pressure is also adopted. The pretreated brine is fed to the high pressure side of the nanofiltration separation system to realize the sufficient separation of magnesium and lithium in the brine by utilizing a differential pressure difference between two sides of the nanofiltration membrane and the difference of the nanofiltration membrane on selectivity of monovalent and divalent ions, and thus the mass ratio of magnesium to lithium in the brine can be effectively reduced, and it is beneficial to improving the concentration of lithium ions in the nanofiltration permeate. Moreover, through the nanofiltration separation device set in multiple stages, multi-stage nanofiltration can be carried out on the pretreated brine. After multi-stage nanofiltration, the magnesium/lithium ratio of the salina aged brine can be greatly reduced, and the efficient separation of magnesium and lithium can be realized.

Finally, the present application can recover and recycle the nanofiltration concentrate generated in the process of nanofiltration and the reverse osmosis permeate generated in the process of reverse osmosis, thereby efficiently reducing the energy consumption of the whole method, reducing the discharge of waste water and saving the process cost.

BRIEF DESCRIPTION OF THE DRAWING

FIGURE is a flow chart of a method for separation and enrichment of lithium according to example 1.

DETAILED DESCRIPTION

The salina aged brine in examples of the present application is from sulfate type lakes in Qinghai Area. In the salina aged brine, the concentration of lithium ions is 2.5 g/L, the concentration of magnesium ions is 125 g/L, and the mass ratio of magnesium to lithium is 50:1.

Example 1

This example provides a method for separation and enrichment of lithium. In combination with the procedure of this example shown in FIGURE, the method of this example comprises the following steps:

Pretreatment: the above salina aged brine was diluted for the first time with dilution multiple being 2.5 times, and the salina aged brine after first dilution was filtered in the multi-media filter to remove mechanical impurities such as partial sediment, subsequently filtered in an organic ultrafiltration system to completely remove impurities, and then diluted for the second times with dilution multiple being 7.5 times, so as to obtain the pretreated brine.

Separation: the pretreated brine was separated by the nanofiltration separation system to obtain nanofiltration permeate and nanofiltration concentrate, wherein in the nanofiltration permeate, the concentration of lithium ions was 1.1 g/L, the concentration of magnesium ions was reduced to 0.13 g/L, and the mass ratio of magnesium to lithium was 0.118:1. Specifically, the nanofiltration separation system adopted the monovalent ion selective nanofiltration membrane. The nanofiltration separation system included two stages of nanofiltration separation devices, and each stage of the nanofiltration separation device was formed by connecting three sections of nanofiltration separation units in series. The pretreated brine was subjected to separation of magnesium and lithium via three sections of nanofiltration separation units of the first-stage nanofiltration separation device and then subjected to further separation of magnesium and lithium via three sections of nanofiltration separation units of the second-stage nanofiltration separation device, so as to obtain nanofiltration permeate and nanofiltration concentrate after two stages of nanofiltration separation, wherein the nanofiltration concentrate was recycled through the energy recovery device to reduce the discharge of waste water. In the nanofiltration separation device of this example, the quantity ratio of nanofiltration membranes of three sections of nanofiltration separation units was (55~65): (52~68): (35~45) in sequence, and the operation pressure of the nanofiltration separation system was 3.6 MPa~4.5 MPa. Separation of magnesium and lithium can be more effectively realized by using the quantity ratio of various nanofiltration membranes. Meanwhile, since the nanofiltration separation in this example was carried out under the condition of ultrahigh pressure of greater than 3.6 MPa, it is beneficial to further improving the separation effect of magnesium and lithium and improving the content of lithium ions in the nanofiltration permeate.

First concentration: the nanofiltration permeate was subjected to first concentration via the reverse osmosis system to obtain reverse osmosis concentrate and reverse osmosis permeate, wherein the concentration of lithium ions in the reverse osmosis concentrate was 5.0 g/L, and the mass ratio of magnesium to lithium was 0.11:1. Specifically, the reverse osmosis system was formed by connecting three sections of reverse osmosis units in series, each section of reverse osmosis unit respectively contained different quantities of reverse osmosis membranes, the nanofiltration permeate was subjected to first concentration via various sections of reverse osmosis units in turn to obtain reverse osmosis concentrate and reverse osmosis permeate, and the reverse osmosis permeate therein was circulated back to the pretreatment step for diluting the salina aged brine, so as to improve the utilization rate of the reverse osmosis permeate. In the reverse osmosis system of this example, the quantity ratio of reverse osmosis membranes of various sections of reverse osmosis units was (38~46): (25~35): (20~28), and the operation pressure of the first concentration was 7.0 MPa. Through a manner of adopting the quantity ratio of different reverse osmosis membranes, the permeability of lithium in reverse osmosis permeate can be sufficiently reduced, which is conductive to enrichment of lithium in the reverse osmosis concentrate.

Second concentration: a homogeneous membrane was used as an ion exchange membrane of an electrodialysis system, and the reverse osmosis concentrate was subjected to second concentration via the electrodialysis system to obtain electrodialysis concentrate and electrodialysis permeate, wherein in the electrodialysis concentrate, the concentration of lithium ions was 21 g/L, and the mass ratio of magnesium to lithium was 0.115:1. Accordingly, after two concentrations, the concentration of enriched lithium ions in this example had reached the concentration of lithium ions required for preparing high-purity lithium salts and were used for subsequent process steps of preparing lithium salts. In addition, the electrodialysis permeate was circulated back to the first concentration step for concentrating lithium ions. Specifically, the electrodialysis permeate was blended with the nanofiltration permeate obtained from the separation step, and recovery of residual lithium and reuse of electrodialysis permeate were realized through the reverse osmosis system for first concentration.

Compositions of salina aged brine adopted in this example and solution in various separation and concentration stages are as shown in Table 1

TABLE 1

Compositions of salina aged brine and solution in various separation and concentration stages in example 1

| Stage | Ion concentration (g/L) | | Mass ratio of magnesium to lithium |
|---|---|---|---|
| | $Mg^{2+}$ | $Li^+$ | |
| Salina aged brine | 125 | 2.5 | 50 |
| Nanofiltration permeate | 0.13 | 1.1 | 0.118 |
| Reverse osmosis concentrate | 0.55 | 5.0 | 0.11 |
| Electrodialysis concentrate | 2.40 | 21 | 0.115 |

The method in this example realizes the separation of magnesium and lithium and efficient enrichment of lithium in sulfate salt lake brine. The finally obtained electrodialysis concentrate (i.e., second concentrate) can be directly used for preparing high-purity lithium salts due to its high lithium ion concentration. The yield of lithium ions is more than 87% in the whole separation process of magnesium and lithium, and the yield of lithium ions is more than 95% in the whole process of concentrating lithium ions. It can be seen that, the method in this example can effectively improve the utilization rate of lithium ions in the whole process.

Example 2

This example provides a method for separation and enrichment of lithium, comprising the following steps:

Pretreatment: the above salina aged brine was diluted for the first time with dilution multiple being 2.5 times, and the salina aged brine after first dilution was filtered in the multi-media filter to remove mechanical impurities such as partial sediment, subsequently filtered in an organic ultrafiltration system to completely remove impurities, and then diluted for the second time with dilution multiple being 7.5 times, so as to obtain pretreated brine.

Separation: the pretreated brine was separated by the nanofiltration separation system to obtain nanofiltration permeate and nanofiltration concentrate, wherein in the nanofiltration permeate, the concentration of lithium ions was 0.27 g/L, the concentration of magnesium ions was reduced to 0.11 g/L, and the mass ratio of magnesium to lithium was 0.42:1. Specifically, the nanofiltration separation system adopts the monovalent ion selective nanofiltration membrane. The nanofiltration separation system included two stages of nanofiltration separation devices, and each stage of the nanofiltration separation device was formed by connecting three sections of nanofiltration separation units in series. The pretreated brine was subjected to separation of magnesium and lithium via three sections of nanofiltration separation units of the first-stage nanofiltration separation device and then subjected to further separation of magnesium and lithium via three sections of nanofiltration separation units of the second-stage nanofiltration separation device, so as to obtain nanofiltration permeate and nanofiltration concentrate after two stages of nanofiltration separation, wherein the nanofiltration concentrate was recycled through the energy recovery device to reduce the discharge of waste water. In the nanofiltration separation device of this example, the quantity ratio of nanofiltration membranes of three sections of nanofiltration separation units was (55~65): (52~68): (35~45) in sequence, and the operation pressure of the nanofiltration separation system was 4.5 MPa. Separation of magnesium and lithium was more effectively realized by using the quantity ratio of various nanofiltration membranes. Meanwhile, since the nanofiltration separation in this example was carried out at the ultrahigh pressure of 4.5 MPa, it was beneficial to further improving the separation effect of magnesium and lithium and improving the content of lithium ions in the nanofiltration permeate.

First concentration: the nanofiltration permeate was subjected to first concentration via the reverse osmosis system to obtain reverse osmosis concentrate and reverse osmosis permeate, wherein the concentration of lithium ions in the reverse osmosis concentrate was 2.8 g/L, the mass ratio of magnesium to lithium was 0.40:1. Specifically, the reverse osmosis system was formed by connecting three sections of reverse osmosis units in series, each section of reverse osmosis unit respectively contained different quantities of reverse osmosis membranes, the nanofiltration permeate was subjected to first concentration via various sections of reverse osmosis units in turn to obtain reverse osmosis concentrate and reverse osmosis permeate, the reverse osmosis permeate was circulated back to the pretreatment step for diluting the salina aged brine, so as to improve the utilization rate of the reverse osmosis permeate. In the reverse osmosis system of this example, the quantity ratio of reverse osmosis membranes of various sections of the reverse osmosis units was (22~34): (15~22): (32~43), and the operation pressure of the first concentration was 7.0 MPa. Through a manner of adopting the quantity ratio of multi-section different reverse osmosis membranes, the permeability of lithium in the reverse osmosis permeate was sufficiently reduced, which was conductive to enrichment of lithium in the reverse osmosis concentrate.

Second concentration: a homogeneous membrane was used as an ion exchange membrane of an electrodialysis system, the reverse osmosis concentrate was subjected to second concentration via the electrodialysis system to obtain electrodialysis concentrate and electrodialysis permeate, wherein in the electrodialysis concentrate, the concentration of lithium ions was 12 g/L, and the mass ratio of magnesium to lithium was 0.38:1. Accordingly, after two concentrations, the concentration of enriched lithium ions in this example had reached the concentration of lithium ions required for preparing high-purity lithium salts. In addition, the electrodialysis permeate was circulated back to the first concentration step for concentrating lithium ions. Specifically, the electrodialysis permeate was blended with the nanofiltration permeate obtained from the separation step, and recovery of residual lithium and reuse of electrodialysis permeate were realized through the reverse osmosis system for first concentration.

Compositions of salina aged brine adopted in this example and solution in various separation and concentration stages are as shown in Table 2

TABLE 2

Compositions of salina aged brine and solution in various separation and concentration stages in example 2

| Stage | Ion concentration (g/L) | | Mass ratio of magnesium to lithium |
|---|---|---|---|
| | $Mg^{2+}$ | $Li^+$ | |
| Salina aged brine | 125 | 2.5 | 50 |
| Nanofiltration permeate | 0.11 | 0.27 | 0.42 |
| Reverse osmosis concentrate | 1.12 | 2.8 | 0.40 |

TABLE 2-continued

Compositions of salina aged brine and solution in various separation and concentration stages in example 2

| Stage | Ion concentration (g/L) | | Mass ratio of magnesium to lithium |
|---|---|---|---|
| | $Mg^{2+}$ | $Li^+$ | |
| Electrodialysis concentrate | 4.56 | 12 | 0.38 |

The method in this example realizes the separation of magnesium and lithium and efficient enrichment of lithium in sulfate salt lake brine. The finally obtained electrodialysis concentrate (i.e., second concentrate) can be directly used for preparing high-purity lithium salts due to its high lithium ion concentration. The yield of lithium ions is more than 75% in the whole separation process of magnesium and lithium, and the yield of lithium ions is more than 80% in the whole process of concentrating lithium ions. It can be seen that, the method in this example can effectively improve the utilization rate of lithium ions in the whole process.

Example 3

This example provides a method for separation and enrichment of lithium, comprising the following steps:

Pretreatment: the above salina aged brine was diluted for the first time with dilution multiple being 2.5 times, the salina aged brine after first dilution was filtered in the multi-media filter to remove mechanical impurities such as partial sand, subsequently filtered in an organic ultrafiltration system to completely remove impurities, and then diluted for the second time with dilution multiple being 7.5 times, so as to obtain the pretreated brine.

Separation: the pretreated brine was separated by the nanofiltration separation system to obtain nanofiltration permeate and nanofiltration concentrate, wherein in the nanofiltration permeate, the concentration of lithium ions is 0.80 g/L, the concentration of magnesium ions was reduced to 0.29 g/L, and the mass ratio of magnesium to lithium was 0.36:1. Specifically, the nanofiltration separation system adopts the monovalent ion selective nanofiltration membrane. The nanofiltration separation system included two stages of nanofiltration separation devices, and each stage of the nanofiltration separation device was formed by connecting three sections of nanofiltration separation units in series. The pretreated brine was firstly subjected to separation of magnesium and lithium via three sections of nanofiltration separation units of the first-stage nanofiltration separation device and then subjected to further separation of magnesium and lithium via three sections of nanofiltration separation units of the second-stage nanofiltration separation device, so as to obtain nanofiltration permeate and nanofiltration concentrate after two stages of nanofiltration separation, wherein the nanofiltration concentrate was circulated through the energy recovery device to reduce the discharge of waste water. In the nanofiltration separation device of this example, the quantity ratio of nanofiltration membranes of three sections of nanofiltration separation units was (45~60): (45~60): (30~50) in sequence, and the operation pressure of the nanofiltration separation system was 4.5 MPa. Adoption of the quantity ratio of various sections of nanofiltration membranes was capable of realizing separation of magnesium and lithium. Meanwhile, since the nanofiltration separation in this example was carried out at the ultrahigh pressure of 4.5 MPa, it is beneficial to further improving the separation effect of magnesium and lithium and improving the content of lithium ions in the nanofiltration permeate.

First concentration: the nanofiltration permeate was subjected to first concentration via the reverse osmosis system to obtain reverse osmosis concentrate and reverse osmosis permeate, wherein the concentration of lithium ions in the reverse osmosis concentrate was 4.0 g/L, the mass ratio of magnesium to lithium was 0.36:1. Specifically, the reverse osmosis system was formed by connecting three sections of reverse osmosis units in series, each section of reverse osmosis unit respectively contained different quantities of reverse osmosis membranes, the nanofiltration permeate was subjected to first concentration via various sections of reverse osmosis units in turn to obtain reverse osmosis concentrate and reverse osmosis permeate, and the reverse osmosis permeate was circulated back to the step of pretreatment for diluting the salina aged brine, so as to improve the utilization rate of the reverse osmosis permeate. In the reverse osmosis system of this example, the quantity ratio of reverse osmosis membranes of various sections of reverse osmosis units was (35~43): (20~30): (20~28), and the operation pressure of the first concentration was 7.0 MPa. Through a manner of adopting the quantity ratio of multi-section different reverse osmosis membranes, the permeability of lithium in reverse osmosis permeate can be sufficiently reduced, which is conductive to enrichment of lithium in the reverse osmosis concentrate.

Second concentration: a homogeneous membrane was used as an ion exchange membrane of an electrodialysis system, and the reverse osmosis concentrate was subjected to second concentration via the electrodialysis system to obtain electrodialysis concentrate and electrodialysis permeate, wherein in the electrodialysis concentrate, the concentration of lithium ions was 19 g/L, and the mass ratio of magnesium to lithium was 0.35:1. Accordingly, after two concentrations, the concentration of enriched lithium ions in this example had reached the concentration of lithium ions required for preparing high-purity lithium salts. In addition, the electrodialysis permeate was circulated back to the first concentration step for concentrating lithium ions. Specifically, the electrodialysis permeate was blended with the nanofiltration permeate obtained from the separation step, and recovery of residual lithium and reuse of electrodialysis permeate were realized through the reverse osmosis system for first concentration.

Compositions of salina aged brine adopted in this example and solution in various separation and concentration stages are as shown in Table 3

TABLE 3

Compositions of salina aged brine and solution in various separation and concentration stages in example 3

| Stage | Ion concentration (g/L) | | Mass ratio of magnesium ion to lithium ion |
|---|---|---|---|
| | $Mg^{2+}$ | $Li^+$ | |
| Salina aged brine | 125 | 2.5 | 50 |
| Nanofiltration permeate | 0.29 | 0.80 | 0.36 |
| Reverse osmosis concentrate | 1.43 | 4.0 | 0.36 |
| Electrodialysis concentrate | 6.6 | 19 | 0.35 |

The method in this example realizes the separation of magnesium and lithium and efficient enrichment of lithium in sulfate salt lake brine. The finally obtained electrodialysis concentrate (i.e., second concentrate) can be directly used for preparing high-purity lithium salts due to its high lithium ion concentration.

It should be understood that the above examples are only for illustrating the present application but not intended to limit the scope of protection of the present application. At the same time, it should be understood that after reading the technical content of the present application, those skilled in the art can make appropriate changes to the conditions and steps in the technical solution of the disclosure without departing from the principle of the present application, so as to realize the final technical solution. All these equivalents fall within the scope of protection defined in the appended claims of the present application.

What is claimed is:

1. A method for a separation and enrichment of lithium, comprising:
   a pretreatment step: performing a first dilution, a second dilution and filtering on a salina aged brine to obtain a pretreated brine;
   a separation step: separating the pretreated brine via a nanofiltration separation system to obtain a nanofiltration permeate and a nanofiltration concentrate;
   a first concentration step: performing a first concentration on the nanofiltration permeate via a reverse osmosis system to obtain a reverse osmosis concentrate and a reverse osmosis permeate; and
   a second concentration step: performing a second concentration on the reverse osmosis concentrate via an electrodialysis system to obtain an electrodialysis concentrate and an electrodialysis permeate, wherein the electrodialysis concentrate is a solution enriching lithium ions;
   wherein the reverse osmosis system is formed by connecting a plurality of sections of reverse osmosis units in series, the nanofiltration permeate is subjected to the first concentration via the plurality of sections of the reverse osmosis units in sequence to obtain the reverse osmosis concentrate and the reverse osmosis permeate, the reverse osmosis permeate is circulated back to the pretreatment step and configured to dilute the salina aged brine;
   wherein the reverse osmosis system is formed by connecting three sections of the reverse osmosis units in series, a quantity ratio of reverse osmosis membranes of the three sections of the reverse osmosis units is (38-46):(25-35):(20-28); an operation pressure in the first concentration step is 3.5 MPa-7.0 MPa, a concentration of lithium ions in the reverse osmosis concentrate is 3.0 g/L-5.0 g/L, and a mass ratio of magnesium to lithium in the reverse osmosis concentrate is (0.07-0.2):1.

2. The method according to claim 1, wherein the pretreatment step comprises: after the salina aged brine is subjected to the first dilution, performing the filtering on the salina aged brine successively in a multi-media filter and an ultrafiltration system, and performing the second dilution on the salina aged brine to obtain the pretreated brine.

3. The method according to claim 2, wherein in a salina aged brine before the pretreatment step, a concentration of lithium ions in the salina aged brine is 0.2 g/L-5.0 g/L, a mass ratio of magnesium to lithium in the salina aged brine is (6-180):1; and in the pretreatment step, a dilution multiple of the first dilution of the salina aged brine is 0.5-4.5 times, and a dilution multiple of the second dilution after the filtering via the ultrafiltration system is 3.5-20 times.

4. The method according to claim 1, wherein in the separation step, the nanofiltration separation system adopts a monovalent ion selective nanofiltration membrane, the nanofiltration separation system comprises at least two stages of nanofiltration separation devices, and each stage of the at least two stages of the nanofiltration separation devices is formed by connecting a plurality of sections of nanofiltration separation units in series;
   the pretreated brine is subjected to a first separation of magnesium and lithium via the plurality of sections of the nanofiltration separation units of a first-stage nanofiltration separation device of the at least two stages of the nanofiltration separation devices, and subjected to a second separation of magnesium and lithium via the plurality of sections of the nanofiltration separation units of a second-stage nanofiltration separation device of the at least two stages of the nanofiltration separation devices to obtain the nanofiltration permeate and the nanofiltration concentrate, wherein the nanofiltration concentrate is circulated by an energy recovery device.

5. The method according to claim 4, wherein the nanofiltration separation system comprises two stages of nanofiltration separation devices, and each stage of the two stages of the nanofiltration separation devices is formed by connecting three sections of nanofiltration separation units in series; a quantity ratio of nanofiltration membranes of the three sections of the nanofiltration separation units in each stage of the two stages of the nanofiltration separation devices is (35-85):(43-70):(25-55); an operation pressure of the nanofiltration separation system is 1.0 MPa-5.0 MPa, a concentration of lithium ions in the nanofiltration permeate is 0.2 g/L-2.0 g/L, and a mass ratio of magnesium to lithium in the nanofiltration permeate is (0.02-0.5):1.

6. The method according to claim 1, wherein in the electrodialysis step, an ion exchange membrane used in the electrodialysis system is one selected from the group consisting of a homogeneous membrane, a semi-homogeneous membrane and a non-homogeneous membrane; the electrodialysis permeate is circulated back to the first concentration step and configured to concentrate lithium ions, a concentration of the lithium ions in the electrodialysis concentrate is 8 g/L-21 g/L, and a mass ratio of magnesium to lithium in the electrodialysis concentrate is (0.05-1.0):1.

7. The method according to claim 6, wherein in the electrodialysis step, the ion exchange membrane used in the electrodialysis system is the homogeneous membrane, and a cation exchange membrane is a CMX homogeneous membrane, and an anion exchange membrane adopts an AMX homogeneous membrane; the concentration of the lithium ions in the electrodialysis concentrate is 14 g/L-21 g/L, and the mass ratio of the magnesium to the lithium in the electrodialysis concentrate is (0.07-0.2):1.

* * * * *